US006530770B2

(12) United States Patent
Sheffield et al.

(10) Patent No.: US 6,530,770 B2
(45) Date of Patent: Mar. 11, 2003

(54) MOLD NOZZLE TIP LOCK

(76) Inventors: James Sheffield, PR 1, Loretto, Ontario (CA), L0G 1L0; Mario Giansante, 11 Scotia Drive, Brampton, Ontario (CA), L6Y 2W3; John Kuipers, 12 Newby Court, Brampton, Ontario (CA), L6V 2R8

( * ) Notice: Subject to any disclaimer, the term of this patent is extended or adjusted under 35 U.S.C. 154(b) by 22 days.

(21) Appl. No.: 09/805,063

(22) Filed: Mar. 14, 2001

(65) Prior Publication Data
US 2002/0132023 A1 Sep. 19, 2002

(51) Int. Cl.[7] ................................................ B29C 45/20
(52) U.S. Cl. ................................. 425/192 R; 425/568
(58) Field of Search .......................... 425/192 R, 542, 425/DIG. 227, 568, 191

(56) References Cited

U.S. PATENT DOCUMENTS

| 2,529,146 | A | * | 11/1950 | Feitl ........................... 425/191 |
| 4,389,002 | A | * | 6/1983 | Devellian et al. ......... 222/146.4 |
| 4,434,053 | A | * | 2/1984 | Osuna-Diaz ................. 210/446 |
| 5,851,565 | A | * | 12/1998 | Garver et al. ................ 425/190 |
| 5,885,316 | A | * | 3/1999 | Sato et al. ...................... 65/324 |
| 6,254,377 | B1 | * | 7/2001 | Kazmer et al. ............. 425/562 |
| 6,394,785 | B1 | * | 5/2002 | Ciccone ....................... 425/549 |

* cited by examiner

Primary Examiner—Jan H. Silbaugh
Assistant Examiner—Emmanuel S. Luk

(57) ABSTRACT

A mold assembly is made up of a nozzle tip and a nozzle tip receiving housing. The nozzle tip has an outwardly projecting shoulder and a threaded base and the housing has a hollow stem with an internal recess and a threaded socket for receiving the base of the nozzle tip. The assembly further includes a locking member having both internal and external projections. The locking member fits over the nozzle tip with the external projection of the locking member locating within the internal recess of the housing stem and with the outwardly projecting shoulder of the nozzle tip trapped by the internal projection of the locking member to block unthreading of the nozzle tip from the housing.

8 Claims, 2 Drawing Sheets

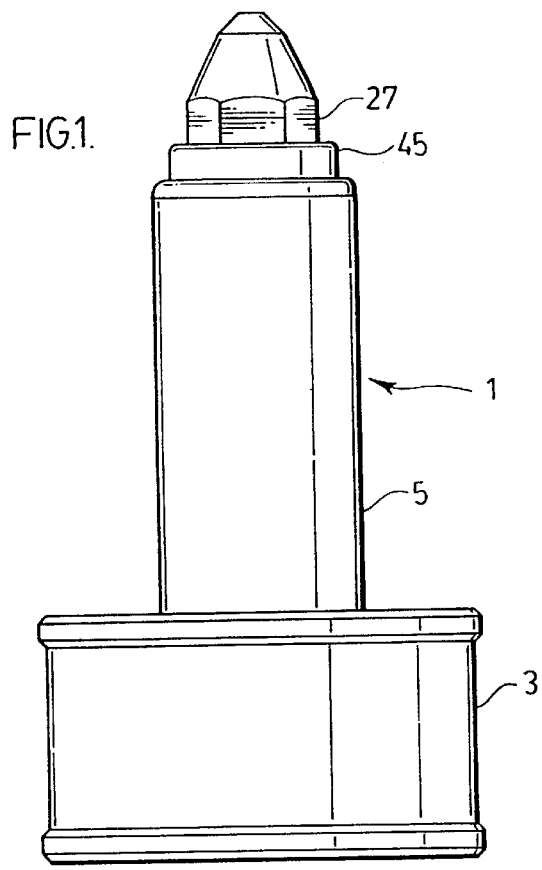
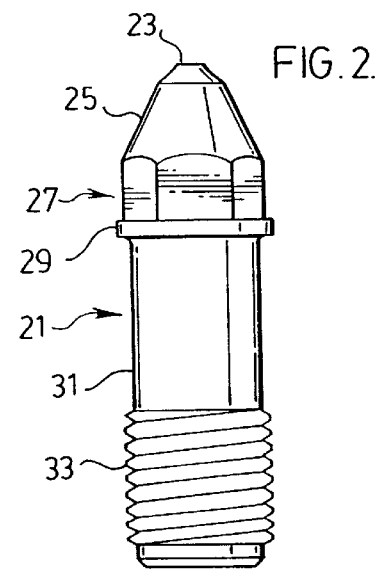
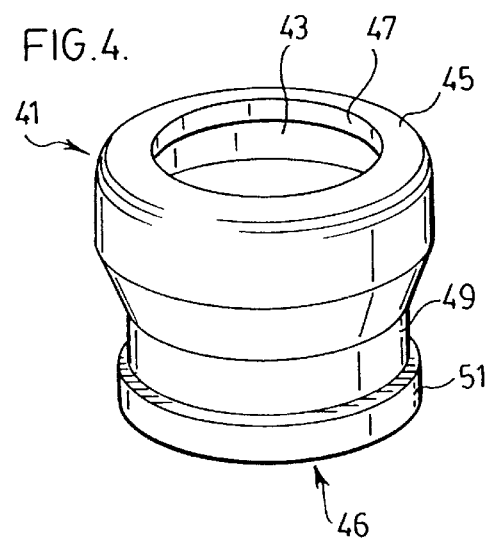
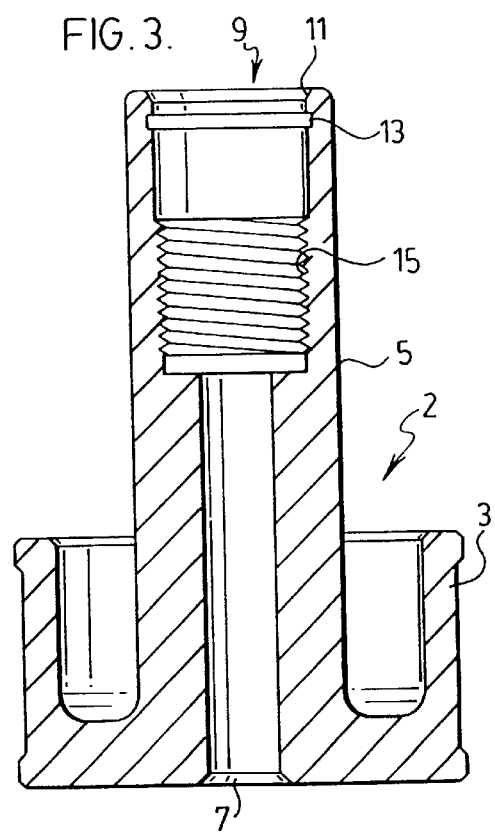

MOLD NOZZLE TIP LOCK

FIELD OF THE INVENTION

The present invention relates to the locking of a nozzle tip within a nozzle tip housing of a mold.

BACKGROUND OF THE INVENTION

Molds which are used to injection mold plastic parts include nozzle tips held within a nozzle tip housing of the mold. These nozzle tips are generally threaded into position which then enables them to be unthreaded from the mold for purposes of maintenance, cleaning, replacement etc.

Although the threaded securing of the nozzle tip within the housing has the benefits noted above, it also results in some disadvantages. Most particularly, the nozzle tip has a tendency, under operating pressures of the mold, to inadvertently unthread from its housing. This unthreading is typically not noticeable from a visual stand point but is sufficient to adversely affect the accuracy of the mold.

The prior art does teach some answers to this unthreading problem. For example, it is known to thread a separate locking nut into the housing over the threaded base of the nozzle tip. However, this arrangement suffers from its own drawbacks including the fact that the separate locking nut can itself prematurely release and further that the use of the nut necessitates substantial revisions to the nozzle tip housing. All of this makes the modification to the mold quite sizable, complicated and costly.

SUMMARY OF THE PRESENT INVENTION

The present invention relates to a mold assembly including a nozzle tip locked into its housing by means of a relatively small inexpensive yet effective locking member which necessitates very little in the way of modification to either the nozzle tip or the nozzle tip housing.

More particularly, a mold assembly according to the present invention comprises a nozzle tip having a threaded base which secures within a threaded socket of a hollow stem of a nozzle tip housing. The nozzle tip includes an outwardly projecting shoulder and the hollow stem of the housing has an internal recess for purposes it be described immediately below.

The assembly further includes a locking member having both internal and external projections. The locking member fits over the nozzle tip with the external projection of the locking member located within the internal recess of the housing stem and with the outwardly projecting shoulder of the nozzle tip trapped by the internal projection of the locking member to block unthreading of the nozzle tip from the housing.

BRIEF DESCRIPTION OF THE DRAWINGS

The above as well as other advantages and features of the present invention will be described in greater detail according to the preferred embodiments of the present invention in which;

FIG. 1 is a side view of a mold assembly according to a preferred embodiment of the present invention.

FIG. 2 is a side view of the nozzle tip removed from the mold assembly of FIG. 1.

FIG. 3 is a sectional view of the housing of the mold assembly of FIG. 1.

FIG. 4 is a perspective view of the locking member from the mold assembly of FIG. 1.

DETAILED DESCRIPTION ACCORDING TO THE PREFERRED EMBODIMENTS OF THE PRESENT INVENTION IN WHICH:

FIG. 1 shows a mold assembly generally indicated at 1. This assembly comprises a nozzle tip 21 better shown in FIG. 2 of the drawings. This nozzle tip is secured within a nozzle tip housing generally indicated at 2. A locking member generally indicated at 41 shown in FIG. 4 of the drawings in provided in assembly 1 to block undesired release of the nozzle tip from the nozzle tip housing.

Figure 6:
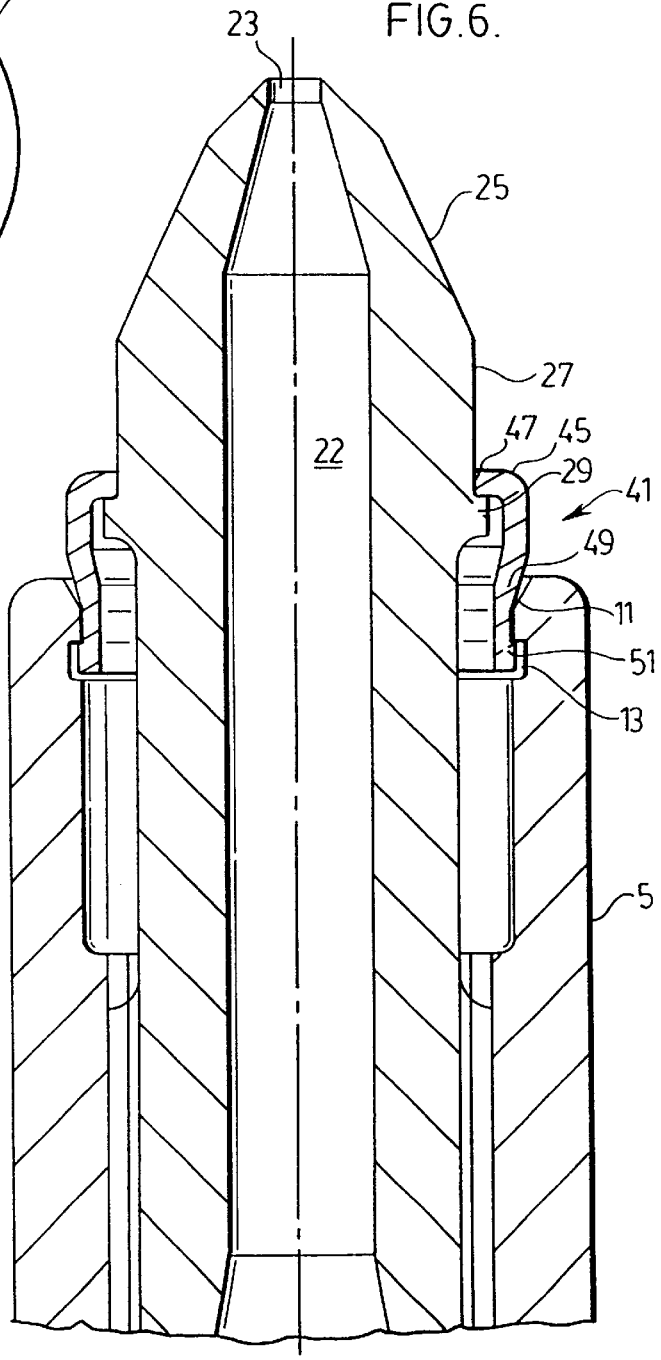
FIG. 6 is an enlarged sectional view of the upper end region of the mold assembly of FIG. 1.

Nozzle tip housing 2 secures within an injection mold in the hot runner section of the mold. As will be seen in FIG. 3, housing 2 has a centre opening 7 to receive molten plastic. This centre opening aligns with a centre passage 22 in the nozzle tip as seen in FIG. 6 of the drawings. This centre passage then feeds out through a centre feed 23 in the apex head of the tip as also shown in FIG. 6. This particular design is a through hole nozzle tip.

The through hole nozzle tip described immediately above, can easily be replaced by a diverted hole nozzle tip which rather than having a centre passage includes off centre passages through the angled face 25 of the tip.

Returning to FIG. 3 nozzle tip housing 2 comprises a base portion 3 for securing the housing within the mold and a stem portion 5 extending from the base portion of the housing. Stem portion 5 has an open mouth generally indicated at 9. This open mouth leading to the hollow interior of the stem is defined by a tapered mouth wall 11 the purpose of which will be described later in detail.

Provided within stem 5 is a threaded socket region 15. A grooved wall recess 13 is also provided internally of the stem just inside of the open stem mouth. Again, the purpose of this wall recess will be described later in detail.

Turning now to FIG. 2, nozzle tip 21 has a threaded base 33 which threads into the socket 15 of the stem of the housing. The nozzle tip further includes a raised shoulder 29 separated from the threaded base by a cylindrical body portion 31 of the nozzle tip.

The nozzle tip additionally includes a multifaced region 27 on the opposite side of shoulder 29 from threaded base 33. Region 27 is shaped to enable the use of a tool such as a wrench or the like to be fitted onto the nozzle tip for purposes of threading and unthreading the nozzle tip into and out of the housing.

Figure 5:
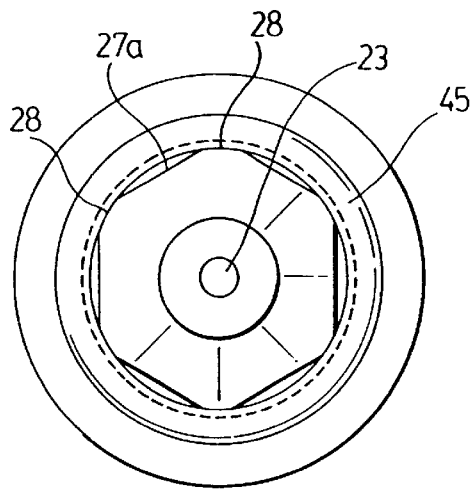
FIG. 5 is a top view of the mold assembly of FIG. 1.

Note in FIG. 5 that each of the separate faces 27a of face region 27 is bordered by a flattened or truncated corner region 28.

Locking member 41 seen in FIG. 4 of the drawings is the final component in the mold assembly. This locking member is in the form of an elongated ring having a centre opening 43 through the ring.

The one end 45 of the ring is defined by an inwardly directed shoulder 47 which reduces the diameter of the centre opening at the ring end 45.

The ring includes a skirt 49 which tapers inwardly away from the ring end 45. This skirt is terminated by an outwardly projecting shoulder 51 around the ring end 46 opposite from ring end 45.

As will be seen in FIG. 6 of the drawings the external diameter of locking member 41 at outwardly projecting shoulder 51 is greater than the interior diameter of the locking member at inwardly directed shoulder 47.

For purposes of assembling all three of the components, the nozzle tip is first threaded at its base into the socket of the housing stem. A tool such as a wrench or the like may be used for tightening the threaded interlock between the nozzle tip and the housing.

Locking member 41 is then placed over the head of the nozzle tip with the end 46 of the locking member facing the housing stem. The rounding of the corner regions 28 of face region 27 allows the ring shaped body of the locking member to easily fit on the nozzle tip.

The internal diameter of the stem mouth immediately below the tapered mouth wall 11 is less than the external diameter of the raised shoulder 51 on the locking member. This then necessitates a slight inward collapsing of the skirt 49 of the locking member to move the locking member into its locking position as shown in FIG. 6. This inward collapsing of the skirt is accomplished as a result of a number of different actions. Firstly, a tool is placed against the end 45 of the locking member. This tool would be for example, a standard socket wrench slid over the face region 27 of the nozzle tip.

By tapping the tool pressure is applied to slide the locking member into the locking position. The tapering of the mouth wall 11 provides a inward camming action on the locking member skirt. Note in FIG. 6 that the wall thickness of the skirt of locking member which would be made from a material such as spring steel or the like is slightly reduced relative to the wall thickness of the rest of the locking member. This adds to the inwardly collapsible nature of the skirt.

Locking member will slide along the nozzle tip until the external shoulder 51 on the locking member skirt reaches the wall recess 13 internally of the housing stem 5. At this point, the skirt, as a result of its springy nature, rebounds outwardly to positively lock shoulder 51 within recess 13. The locking action is accompanied by a noticeable clicking sound which provides audio feedback that the locking member has been fully moved into the locking position.

As will be seen in the drawings, when the locking member reaches it final locking position, the internal shoulder 47 of the locking member located adjacent the upper side of the nozzle tip external shoulder i.e. to the side pf shoulder 29 facing away from shoulder 51 of the locking member. Accordingly, the nozzle tip is blocked from unthreading from the housing by the internal shoulder of the locking member with the locking member itself being held by its external shoulder within the housing stem.

The amount of block provided by locking member 41 on the nozzle tip is sufficient to resist unthreading of the tip from the housing during normal operation of the mold. However, the tip can be released from its housing by a deliberate unthreading action. In other words, if it is desired to remove the nozzle tip one can simply do so by unthreading it through the use of a tool. This deliberate unthreading action will pull the locking member out of the housing stem away from its locking position.

As will be seen from the description above, the locking of the nozzle tip is achieved using a very simple yet efficient locking member that necessitates very little in the way of modification to the assembly, i.e., only the inclusion of the shoulder 29 on the nozzle tip and the provision of the recess wall 13 within the housing stem. Furthermore, there is essentially no change in the overall size of the nozzle tip and housing combination as a result of the provision of the locking member and very little has been added from a cost stand point to the overall assembly.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A mold assembly comprising a nozzle tip locked in a nozzle tip housing by a locking member, said housing including a hollow stem with an open mouth and with a threaded socket at opposite ends of said stem, said stem further including a wall recess within said stem, said nozzle tip having an outer end with an apex head and a plastic feed outlet through said head, an inner end with a threaded base which threads into said threaded socket of said housing and a shoulder projecting radially from a side surface of said nozzle tip between said head and said base of said nozzle tip, said locking member comprising a ring member having both an internal and an external shoulder, the external shoulder of the locking member locating within said wall recess of said stem around said nozzle tip to trap said locking member in said housing and said internal shoulder of said locking member projecting inwardly over said shoulder on said nozzle tip inwardly along said nozzle tip at a location away from said apex head of said nozzle tip to block said nozzle tip against unthreading from said nozzle tip housing.

2. A mold assembly as claimed in claim 1 in which said nozzle tip includes a tool grip surface which is located between said shoulder on said side surface of said nozzle tip and said apex head of said nozzle tip, said tool grip surface of said nozzle tip being exposed along said nozzle tip outwardly of said locking member.

3. A mold assembly as claimed in claim 2 wherein said internal and external shoulders of said locking member extend completely therearound and wherein said wall recess extends interiorly around said stem of said housing.

4. A mold assembly as claimed in claim 2 in which said external shoulder of said locking member has an outside diameter greater than internal diameter of said mouth of said stem, said locking member including a flexible skirt portion between said internal and external shoulders of said locking member, said flexible skirt allowing said external shoulder of said locking member to collapse inwardly and to slide through said mouth of said stem to said wall recess on said stem where said external shoulder of said locking member rebounds outwardly to lock into said wall recess of said stem.

5. A mold assembly as claimed in claim 4 wherein said skirt portion of said locking member tapers inwardly to provide said locking member with a decreasing outside diameter between said internal shoulder and said external shoulder of said locking member.

6. A mold assembly as claimed in claim 5 wherein said skirt portion is of a decreased wall thickness such that said locking member is more flexible at said external shoulder than at said internal shoulder thereof.

7. A mold assembly as claim in claim 4 wherein the mouth of said hollow stem is bordered by a tapered mouth wall which provides a cam guide for insertion of said external shoulder of said locking member into said hollow stem.

8. A mold assembly as claimed in claim 1 wherein said apex head of said nozzle tip has an outer sloped surface which is tapered axially of said nozzle tip, said plastic feed outlet comprising a diverted plastic feed penetrating through said outer sloped surface of said apex head.

* * * * *